United States Patent [19]
Khosharian

[11] 3,976,976
[45] Aug. 24, 1976

[54] METHOD AND MEANS TO ACCESS AND EXTENDED MEMORY UNIT

[75] Inventor: Vartan N. Khosharian, San Diego, Calif.

[73] Assignee: The United States of America as represented by the Secretary of the Navy, Washington, D.C.

[22] Filed: Apr. 4, 1975

[21] Appl. No.: 565,305

[52] U.S. Cl. .............................................. 340/172.5
[51] Int. Cl.² ............................................ G06F 9/20
[58] Field of Search .................................. 340/172.5

[56] References Cited
UNITED STATES PATENTS
3,251,040  5/1966  Burkholder et al. ............. 340/172.5
3,525,080  8/1970  Couleur et al. ................... 340/172.5
3,525,081  8/1970  Flemming et al. ................ 340/172.5

Primary Examiner—Raulfe B. Zache
Attorney, Agent, or Firm—R. S. Sciascia; G. J. Rubens; T. M. Phillips

[57] ABSTRACT

Access to additional memory is provided by extending two registers and adding a no-index register reference which creates an extended data address register for directly addressing the additional memory.

6 Claims, 4 Drawing Figures

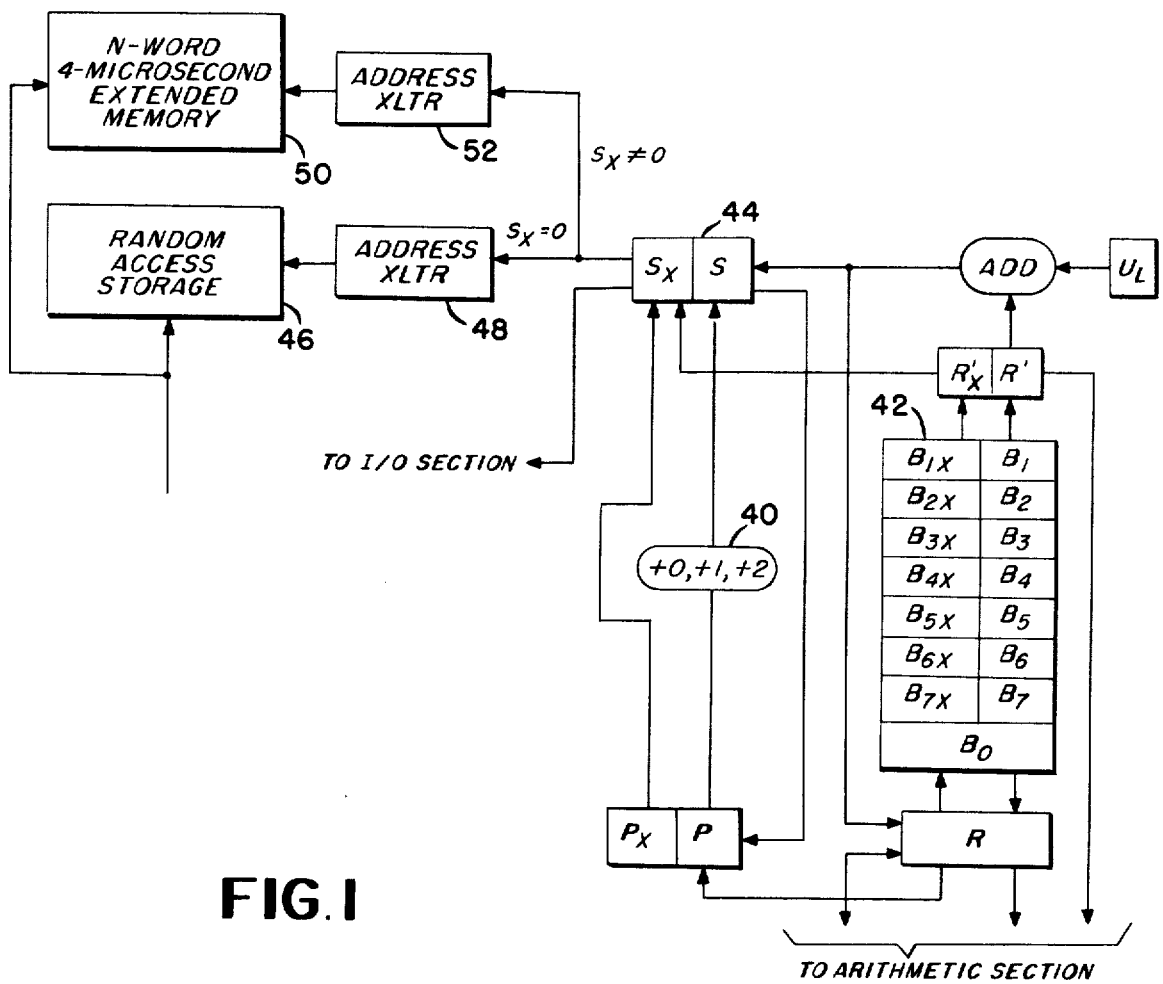
FIG.1
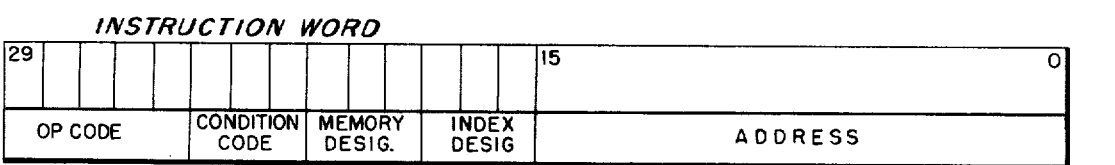
FIG.2
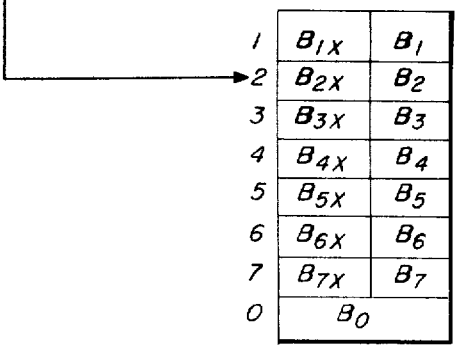

| $S_X$ (INITIAL) | $R'_X$ | ENABLE / DISABLE EXT.MEMORY INT.MEMORY |
|---|---|---|
| 000 | 000 | 0 |
| 000 | 001 | 1 |
| 000 | 010 | 1 |
| 000 | 011 | 1 |
| 000 | 100 | 1 |
| 000 | 101 | 1 |
| 000 | 110 | 1 |
| 000 | 111 | 1 |

…

METHOD AND MEANS TO ACCESS AND EXTENDED MEMORY UNIT

BACKGROUND OF THE INVENTION

The Navy, for some years, has used the USQ-20(V)/CP642 computer series manufactured by Sperry Univac Corporation (Defense Systems Department) in its tactical data system. The CP642 series computers were originally designed and built with 32,000 words of core memory in each unit. The first venture into extended memory was a device called the mass data storage system. The mass data storage system had two possible modes of operation; peripheral access and direct access. Due to the desirability of extending the CP642 series computers on executable memory (a direct access mode), the peripheral access mode was not pursued to any significant extent. An adapter unit was required to interface the mass data storage system with the CP 642 computer. Memory addressing beyond the normal 32,000 words of CP 642 was accomplished by a paging scheme. The paging technique employed the basic 15-bit address within the computer which in turn was partitioned by the adapter unit outside the computer into a 3-bit page designator address containing 6-bits appended to the remaining 12-bit addresses, resulting in an 18-bit address. A major limitation with this paging scheme was that the input/output had to be carefully controlled from within the computer and new instructions were required to set and reset page register values. This approach was costly in software changes to allow effective use of the extended memory. A need then existed for extending the memory of the CP642 computer series which did not require these inordinate amounts of software changes.

SUMMARY OF THE INVENTION

The present invention provides a method and means to directly access an extended memory unit. Direct addressing is defined as addressing a memory directly as opposed to indirectly addressing through a special register, i.e., page and base register. The direct addressing logic of the computer is extended by extending the index as address modification registers. An additional register, $B_o$, is added to provide an address extension when no indexing is performed. Each index register has an extension register associated with it. These extension registers provide additional memory bank indicators. When an instruction calls for indexing, the operand is modified by the specified index register as normal, the extended bits of that index register is appended to the resultant operand to form an extended effective address. The extended effective address is then gated to a memory address register for an operand data fetch which checks the extension bits for zero. If the extension bits are zero the remaining bits address the normal internal memory but if the extended bits are not zero all the bits address the extended memory. A program counter extension register is incorporated for the program counter to allow execution of both pre-existing and extended memory stored instructions. The program counter extension register is appended to the already existing program register to provide for the additional bits of program counter address which is gated to the memory address register for an instruction fetch. Again, a check for internal/external memory references is made. The loading of the program extension register is accomplished by modifying the indirect jump instructions. The contents of the specified address of the operand is loaded into the program counter register and the additional bits of the memory contents are loaded into the program counter register extension.

OBJECTS OF THE INVENTION

An object of the present invention is the provision of a method and means of extending the words of memory of a computer by providing access to an extended memory.

Another object of the invention is the provision of a method and means for extending the memory of a computer by providing for access to an extended memory without affecting the hardware and software logic of the computer. No special instructions are wired into the control logic nor is there any need for the control means for the extended memory to be a separate unit.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a block diagram showing the means of accessing an extended memory of an already existing computer;

FIG. 2 is a diagram illustrating the bit assignment of a typical instruction word employed by the computer of the present invention.

DESCRIPTION OF THE PREFERRED EMBODIMENTS

Figures 3, 4:
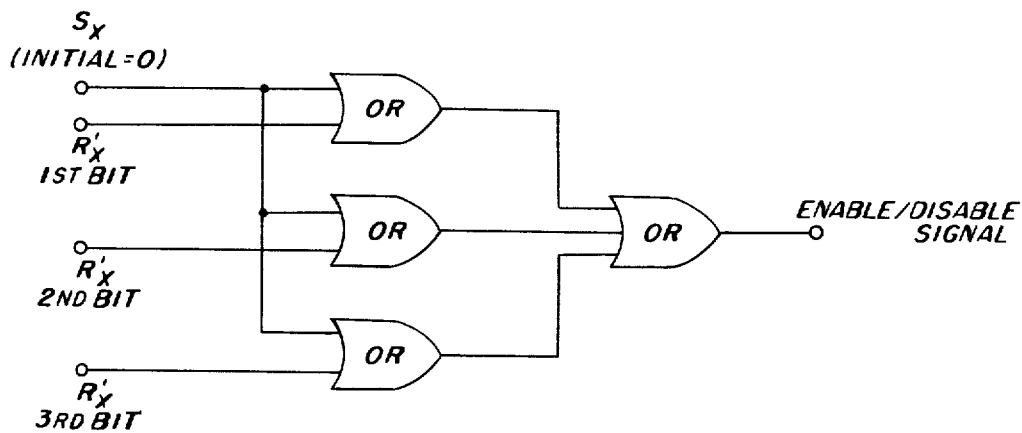
FIG. 3 is an OR gate circuit arrangement for determining when the extended memory is used.
FIG. 4 is the truth table for the circuit of FIG. 3.

For a complete description of the computer system of which the present invention is an improvement, U.S. Pat. No. 3,251,040 is incorporated by reference herein.

Referring now to FIG. 1 wherein there is shown that portion of the UNIVAC CP642 computer control and storage sections which are modified in accordance with the teaching of the present invention. In understanding the invention, specific reference should be made to FIG. 2 of the above mentioned Patent. An important feature of the invention is that the improvement can be made to the CP642 computer without altering the timing. Each of the index, B, registers 42, B1 through B7 is extended by 3 bits. An additional BO register having 18 bits is added. The lower 15 bits of the BO register must always be zero with the upper 3 bits used to address the extended memory 50. The BO register serves as an address extension when no indexing is performed. Each B register (BO through B7) has a 3 bit extension register (B1x through B0x) associated with it. These B1x through B0x extension registers can be termed additional memory bank indicators.

When an instruction calls for indexing, the operand is modified by the specified index designator (see FIG. 2) to select the index register 2, by way of example, in the normal manner. The 3 bits of index register B2x are appended to the 15 bit index register B2 to form an 18 bit extended effective address. The output of the B register is fed to R' register (15 bits) which holds the quantity while it is added to the output of the lower-order 15 bits, UL, during address modification. The added quantity is fed to the S portion (15 bit) of register 44. The output of the BX register (3 bits) is fed to holding register R'X, the output of which is fed to the SX portion (3 bits) of register 44. If the 3 bits (SX) are zero, the remaining 15 bits address the normal internal memory 46 through address translator 48.

The comparison may be made in an OR gate configuration as, for example, that shown in FIG. 3. Initially, SX is pre-set to zero input and the 3 R'X bits are ORed and an output will be gated as shown in the truth table of FIG. 4. As is well known in logic, the contents of the SX register will be inhibited when SX is zero, and will be gated together with the contents of the S register to the external memory 50 when SX is other than zero. If the 3 bits (SX) are other than zero, then an enable/disable signal will appear at the output of the OR circuit of FIG. 3. With internal memory 46 disabled and external memory enabled all 18 bits of register 44 address the additional memory 50 through address translator 52.

A 3 bit PX register is appended to program address register P (15 bits) so the program counter will allow execution of internal instruction stored in internal memory 46 and execution of external instructions stored in memory 50. Memory 50 may be a Micro 3000 manufactured by Electronic Memories and Magnetics. The addition of PX (3 bits) to register P (15 bits) forms, an 18 bit program counter address. The PX register (3 bit) and P register (15 bits) are loaded into memory address registers SX and S, respectively, for an instruction fetch. In the same manner as described above, if the 3 bit register SX is zero then the 15 bit register S fetches an instruction word from memory 46 and if 3 bit register SX is other than zero, all 18 bits (Sx11S) fetch an instruction word from memory 50.

Obviously many modifications and variations of the present invention are possible in the light of the above teachings. It is therefore to be understood that within the scope of the appended claims the invention may be practiced otherwise than as specifically described.

What is claimed is:

1. A method of extending the addressing capability of a computer to a larger memory capacity than the inherent operand portion of the instructions of the computer without affecting hardware and software logic and with no additional instructions or controllers, the steps comprising:
   a. providing a high-speed magnetic core memory having the desired capacity of memory;
   b. extending the memory address register to directly address the higher capacity memory;
   c. extending the program instruction register to directly address the higher capacity memory;
   d. extending the index registers to create an extended data address register for directly addressing the higher capacity memory; and
   e. providing a no-index register reference to create an extended data address register for addressing said higher capacity memory.

2. In a general purpose computer, an improvement for extending the addressing capability to a larger memory capacity than the inherent operand portion of the instructions without restructuring the existing hardware and software logic, said improvement comprising:
   a. a memory means having a predetermined capacity of memory;
   b. extended memory address register means appended to the existing memory address register and being coupled to said memory means and to the existing computer memory;
   c. extended program instruction register means appended to the existing program instruction register and being coupled to said extended memory address register means for directly addressing said memory means;
   d. extended index register means appended to each of the existing index registers and being coupled to said extended memory address register means for directly addressing said memory means;
   e. a no-index register reference means having an extended data address register for directly addressing said memory means when no indexing is called for.

3. The improvement of claim 2 wherein said memory means is addressed only when the input signal to said extended address register means is other than zero.

4. The improvement of claim 3 wherein the appending of said extended program instruction register means to said program instruction register provides an effective program register having an expanded capacity determined by the number of bits in the extended register.

5. The improvement of claim 4 wherein the appending of said extended index register means to said index register provides effective index registers having an extended capacity determined by the number of bits in the extended index registers.

6. The improvement of claim 5 wherein said no index register comprises a reference of all zeros in that portion of its register that corresponds to the existing index register configuration and an extended index register that corresponds to the extended index registers of said index register configuration that responds to a no-index situation to address said predetermined capacity memory.

* * * * *

Disclaimer 3,976,976.—*Vartan N. Khosharian*, San Diego, Calif. METHOD AND MEANS TO ACCESS AND EXTENDED MEMORY UNIT. Patent dated Aug. 24, 1976. Disclaimer filed Mar. 22, 1977, by the assignee, *the United States of America as represented by the Secretary of the Navy*.

Hereby enters this disclaimer to claim 3 of said patent.

[*Official Gazette May 10, 1977.*]